United States Patent [19]
Hammond et al.

[11] Patent Number: 6,132,867
[45] Date of Patent: Oct. 17, 2000

[54] GEL SEALING ARTICLES

[76] Inventors: Philip James Hammond, 3 Noredown Way, Wootton Bassett, Wiltshire, SN4 8BJ; Michael John Percy, 88 Hallsfield, Cricklade, Wiltshire, SN6 6LS; David Bluck, 32 Welcombe Avenue, Park South, Swindon, Wiltshire, SN3 2QS, all of United Kingdom

[21] Appl. No.: 09/142,981
[22] PCT Filed: Mar. 20, 1997
[86] PCT No.: PCT/GB97/00775
§ 371 Date: Sep. 17, 1998
§ 102(e) Date: Sep. 17, 1998
[87] PCT Pub. No.: WO97/35127
PCT Pub. Date: Sep. 25, 1997

[30] Foreign Application Priority Data

Feb. 21, 1996 [GB] United Kingdom ............. 9605927
Feb. 18, 1997 [GB] United Kingdom ............. 9703380

[51] Int. Cl.⁷ ............................................. C08K 3/10
[52] U.S. Cl. ................ 428/361; 428/357; 428/362; 428/377; 428/373; 428/374; 428/392; 428/401; 264/165; 264/172.11; 264/172.15
[58] Field of Search ........................ 428/357, 361, 428/372, 373, 374, 392, 401; 264/165, 172.11, 172.15

[56] References Cited

U.S. PATENT DOCUMENTS

| 4,505,222 | 3/1985 | Holt et al. ............................ 118/304 |
| 5,665,809 | 9/1997 | Wojtowicz ........................... 524/439 |

FOREIGN PATENT DOCUMENTS

| 0 201 604 A1 | 11/1986 | European Pat. Off. ........ B01D 13/00 |
| 0 275 171 A2 | 7/1988 | European Pat. Off. ......... H05K 9/00 |
| 58-184361 | 10/1983 | Japan ............................. F16J 15/10 |
| 1 471 837 | 4/1977 | United Kingdom .............. D01F 8/04 |
| 2 083 087 | 3/1982 | United Kingdom .......... D06M 15/36 |
| 96 09483 | 3/1996 | United Kingdom ............. F16J 15/02 |
| WO 93/05113 A1 | 3/1993 | WIPO ............................ C08L 53/00 |
| WO 94/05935 | 3/1994 | WIPO ............................ F16J 15/02 |
| WO 96/09483 A1 | 3/1996 | WIPO ............................ F16J 15/02 |

OTHER PUBLICATIONS

Search Report for International Application No. PCT/GB97/00775.
Search Report for British Application No. GB 9703380.7.
WPI Abstract Accession No. 94–172746 & JP 06113848 A (Teijin) 1994.
WPI Abstract Accession No. 74–61651V & DE 2307620 (Tokyo Boshi KK) 1974.

*Primary Examiner*—Richard Weisberger

[57] ABSTRACT

A gel profile article comprising a multi-filament yarn carrier carrying an elongate body of gel which encloses more than 50%, preferably more than 75%, more preferably substantially all, of the perimeter of the carrier as viewed in transverse cross-section, wherein the carrier is at least partly composed of synthetic polymeric material, preferably polyester filaments (e.g. polyethylene terephthalate) or spun yarns of a co-mingled blend of polyacrylonitrile staple fibres and polyamide staple fibres ("baby wool"), the proportion of polyamide preferably being at least 30%, more preferably 40–60%, by weight of the said spun yarn(s). The gel is preferably melt-coated, especially pressure-extruded, around the carrier at a gel temperature less than the softening temperature of at least a component of the carrier, and the selected class of carrier materials enhances the processability, cohesion, and appearance of the resulting profile.

16 Claims, No Drawings

GEL SEALING ARTICLES

This invention relates to elongate gel-carrying articles (hereinafter "gel profiles") of various cross-sectional shapes, which may be useful in a wide variety of circumstances for sealing against and/or between surfaces. For avoidance of doubt, it is hereby confirmed that the claims to all articles of this invention relate to free-standing articles carrying the gel and are intended to exclude elongate components such as wires in a gel-containing cable or other assembly. Such components are in contact with the gel only as a result of being in that assembly and are therefore not free-standing gel profiles.

Our co-pending British Patent Application No. 9605927.4 filed on Mar. 21, 1996 and International Application No. PCT/GB96/02000 filed on Aug. 15, 1996 (RK533), from which the present application claims priority, describe profiles comprising an elongate filamentary carrier, one form of which carrier may be a multi-filament yarn, carrying an elongate body of gel which encloses at least 50%, preferably more than 75%, more preferably substantially all, of the perimeter of the carrier as viewed in transverse cross-section. The present invention is concerned with a specific form of carrier which has unexpectedly been found to provide greatly improved processing and appearance of the finished profiles.

The invention accordingly provides an article comprising a multi-filament yarn carrier carrying an elongate body of gel which encloses more than 50%, preferably more than 75%, more preferably substantially all, of the perimeter of the carrier as viewed in transverse cross-section, wherein the carrier is composed of synthetic polymeric material.

The carrier may comprise continuous filaments or one or more spun staple fibre yarns. One form of such carriers is the synthetic knitting yarn commonly known as "baby wool", a sample of which led to the present invention after being serendipitously (and indeed surreptitiously) extracted from the sewing box of the daughter of one of the inventors. The baby wool carrier comprises polyacrylonitrile and polyamide (preferably a nylon) spun from a co-mingled blend of polyacrylonitrile staple fibres and polyamide staple fibres. Trial of this small sample unexpectedly produced such a dramatic improvement in the processing and appearance of the resulting profile that further investigation was clearly warranted. This subsequently indicated a preferred form of the carriers for industrial manufacture of profiles according to the present invention comprising multi-filament polyester, preferably polyethylene terephthalate (PET), yarn in which the filaments are continuous.

Without limiting the invention to any specific theory, it is mentioned that the improved results of using the synthetic multi-filament carriers may be at least partly due to their relatively low retained surface moisture under ambient conditions. This may be less than 4%, preferably less than 3%, more preferably less than 2%, especially less than 1%, by weight, for example as determined by test method RAM10077. When gels are extruded thereon at temperatures typically in the range of 220–230° C., the carriers of the present invention tend easily to receive uniform, homogeneous gel coatings, which are especially visually attractive when clear gels are used.

For such melt-coated profiles, it is preferred to use carriers made of materials whose softening temperatures are above the gel coating temperature. Thus, for gels applied at the above temperatures, fibres of polypropylene or polyacrylics or polyacrylonitriles (e.g. Dralon Trade Mark) alone, or in mixtures with softening-resistant fibres (e.g. wool) in too low proportions (e.g. 5% wool by weight), may have desirably low moisture content, but insufficiently high softening temperatures leading to unacceptable weakness and elongation during the coating process. These materials may, however, be useful with gels which are applicable at lower temperatures. The aforementioned baby wool survives the hotter extrusion process thanks to the presence of a sufficient proportion (e.g. 40–60% by weight) of the nylon staple fibres, which have higher softening temperatures. The preferred yarns of polyester filaments, for example PET available under the Trade Marks Dialen 178T or Texply 7/167, also have sufficiently high softening temperatures to survive satisfactorily. Under subsequent conditions of use, the carrier in the finished profile will preferably have an elongation to break less than 10%, more preferably not more than 5%, especially from 1 to 5%.

It will be understood that the filamentary carrier of these free-standing profiles will often be a relatively narrow yarn, preferably of diameter less than 3 mm, more preferably less than 2 mm or less than 1 mm. However, thicker carriers, for example of diameter 4 or 5 mm or more, may also be useful, as may be flexible carriers of this diameter made up of multiples of thinner carriers. The profiles are generally preferred to be flexible and may be provided in coil or roll form from which the profile can be progressively unwound. In such coils or rolls, the gel of the profiles in each succeeding layer may be in direct contact with that of the underlying layer, or a low-adhesion release sheet or other barrier may be incorporated between the layers of gel profile.

Reference to the view of the carrier in transverse cross-section means that the gel encloses the stated proportions of the perimeter of the carrier as viewed from an end of the article looking along its longitudinal axis. The perimeter enclosed by the gel is thus the perimeter of the cross-section. Substantially complete enclosure of that perimeter of the carrier by the gel is advantageous for many purposes, and may obviate the need for the gel to adhere, or at least to adhere strongly, to the carrier, since the cohesive strength of the gel surrounding the carrier may be sufficient to retain it in on the carrier without such adhesion. For other purposes, however, partial enclosure of the carrier by the gel may be preferable. The filamentary nature of the carrier enables the gel to establish a physical grip on the carrier, to some extent independently of its level of adhesion to the yarn material itself.

The cross-sectional shape of the carrier and that of the gel are not critical for the purposes of this invention. Square, triangular or other shapes, or even irregular shapes, may be used for the carrier and/or the gel if desired or necessary, but substantially oval or round cross-sectional shapes are preferable for the carrier and will often be preferable for the body of gel. Whatever the shape, it will usually be preferable for the cross-sectional shape of the body of gel to be substantially uniform along the article, which may thus resemble a string or cord or flexible rod having an outer surface of gel. It is also usually preferable for the thickness of the body of gel to be substantially uniform around the carrier, thus forming a layer of gel which conforms to the exterior shape of the carrier.

The gel may be applied to the carrier by any convenient method, and preferred articles according to this invention are those wherein the body of gel has been melt-coated onto the carrier, preferably by pressure-extrusion for greater physical grip as aforesaid using equipment and conditions known per se. For example, the invention includes a method of making an article according to the invention, wherein the gel is extruded around the said yarn by means of an extruder head having a hollow pin through which the yarn passes, optionally with a vacuum bleed on the extruder to reduce air entrainment in the yarn as it passes through the extruder pin to meet the gel being extruded by the head. In all aspects of this invention, the gel may be cross-linked after placement on the carrier, although thermoplastic gels on the carrier may be preferable for many purposes.

Articles according to this invention may be useful, for example, for winding around other objects to provide a gel surface thereon, or for laying along surfaces of articles or in channels formed in articles to provide a gel sealant on or in those articles for sealing against other surfaces with which the articles will be in contact in use. The articles of this invention may be overbraided with metal filaments to provide electrically-conductive profiles for EMI shielding purposes, the gel squeezing through apertures in the metal overbraid (or similar apertured structure) when the profile is compressed between surfaces in use as a shielding gasket.

Especially preferred articles according to the various aspects of this invention are those wherein the gel comprises a thermoplastic multi-block, preferably penta-block or more preferably triblock, copolymer having a fluid-extended elastomeric mid-block and having end blocks (preferably polystyrene and/or polymethacrylate end blocks) which are substantially impervious to the extender liquid of the mid-block.

The triblock copolymer gels will preferably have the characteristics and meet the criteria described in any or all of EP-A-0426658 (RK308), WO-A-9305113 (RK451), WO-A-9323472 (RK469), and WO-A-9418273 (RK472), the disclosures of all of which are incorporated herein by reference. Those disclosures deal mainly or wholly with triblocks having polystyrene end blocks. For higher temperature performance, it may be preferable to use the new triblock or penta-block gels having polyalkylmethacrylate end blocks described in WO-A-9700292 (RK509), the disclosure of which is incorporated herein by reference.

In a further aspect of the present invention, the carrier of the profile is a braid, knit, weave, or other fabric-like assembly of the said yarns. These forms of article may again be made by extrusion or moulding techniques similar to those referred to above.

In all aspects of the present invention, the gels may include additives such as cross-linking agents. Fillers and additives may also be used to increase the electrical and/or thermal conductivity of the gels, or to enhance the noise or vibration-absorbing qualities of the gels. Flame retardants, pigments, dyes, and other additives may also be used as desired, if compatible with the desired end-use properties of the gels. The gel surface may be selectively cross-linked, preferably using known cross-linking additives and/or initiators and/or heat and/or UV or electron beam radiation, to form a skin on desired parts of the gel bodies, either to reduce surface adhesion, or to enhance the strength and/or handleability of the gel bodies, or both.

The profiles of the present invention may be used in ways similar to those described in WO-A-9609483 (RK508) and/or in the aforementioned applications from which the present application claims priority, the disclosures of all of which are incorporated herein by reference.

What is claimed is:

1. An article comprising a multi-filament yarn carrier carrying an elongate body of gel which encloses more than 50% of the perimeter of the carrier as viewed in transverse cross-section, wherein the carrier is at least partly composed of synthetic polymeric material, wherein the gel comprises a thermoplastic triblock or multiblock copolymer having a fluid-extended elastomeric mid-block and having end blocks which are substantially impervious to the extender liquid of the mid-block, and wherein the synthetic polymeric material of the carrier comprises polyester or one or more spun yarns of a co-mingled blend of polyacrylonitrile staple fibres and polyamide staple fibres.

2. An article according to claim 1, wherein the carrier comprises one or more spun staple fibre yarns.

3. An article according to claim 1, wherein the proportion of polyamide staple fibres is at least 30% by weight of the said spun yarn(s).

4. An article according to claim 1, wherein the carrier comprises one or more continuous filaments.

5. An article according to claim 1, wherein the carrier fibres is polyethylene terephthalate.

6. An article according to claim 1, wherein the gel, at least as initially applied to the carrier, is thermoplastic.

7. An article according to claim 6, wherein the gel has been melt-coated around the carrier at a gel temperature less than the softening temperature of at least a component of the carrier present in a proportion of 30% or more by weight.

8. An article according to claim 1, wherein the gel has been cross-linked after placement on the carrier.

9. An article according to claim 1, wherein the cross-sectional shape of the body of gel is substantially uniform along the article and/or the thickness of the body of gel is substantially uniform around the carrier.

10. An article according to claim 1, wherein the carrier is one of a braid, knit or weave of the said yarn.

11. An article according to claim 1 wherein the said yarn immediately before application of the gel thereto has a moisture content less than 4%, by weight.

12. An article according to claim 1, wherein the said yarn in the article has an elongation to break less than 10%.

13. A method of making an article according to claim 1, wherein the gel is extruded around the said yarn by means of an extruder head having a hollow pin through which the yarn passes.

14. An article according to claim 1, which has been enclosed in a fabric of electrically-conductive or other filaments.

15. A method of making an article according to claim 13, further comprising a vacuum bleed on the extruder to reduce air entrainment in the yarn as it passes through the extruder pin to meet the gel being extruded by the head.

16. An article according to claim 3, wherein the proportion of polyamide being at least 30%, by weight, of the said spun yarn(s).

* * * * *